United States Patent
Stubler et al.

(10) Patent No.: US 9,446,541 B2
(45) Date of Patent: Sep. 20, 2016

(54) METHOD OF PROTECTING THE END OF A MULTI-TENDON CABLE

(75) Inventors: Jerome Stubler, Paris (FR); Aurelien Sylvestre, Paris (FR); Stephane Joye, Boulogne-Billancourt (FR); Erik Mellier, Versailles (FR)

(73) Assignee: SOLETANCHE FREYSSINET, Rueil Malmaison (FR)

( * ) Notice: Subject to any disclaimer, the term of this patent is extended or adjusted under 35 U.S.C. 154(b) by 369 days.

(21) Appl. No.: 14/009,767

(22) PCT Filed: Apr. 15, 2011

(86) PCT No.: PCT/IB2011/001046
§ 371 (c)(1),
(2), (4) Date: Oct. 3, 2013

(87) PCT Pub. No.: WO2012/140462
PCT Pub. Date: Oct. 18, 2012

(65) Prior Publication Data
US 2014/0021649 A1   Jan. 23, 2014

(51) Int. Cl.
*B29C 45/14* (2006.01)
*E04C 5/12* (2006.01)

(52) U.S. Cl.
CPC ......... *B29C 45/14426* (2013.01); *E04C 5/122* (2013.01)

(58) Field of Classification Search
None
See application file for complete search history.

(56) References Cited

U.S. PATENT DOCUMENTS

| | | | | |
|---|---|---|---|---|
| 4,557,007 A | * | 12/1985 | Daiguji | E01D 19/14 14/21 |
| 5,173,982 A | | 12/1992 | Lovett et al. | |
| 6,055,691 A | | 5/2000 | Nutzel et al. | |
| 6,578,329 B1 | * | 6/2003 | Stubler | E01D 19/14 24/122.6 |
| 8,925,266 B2 | * | 1/2015 | Stubler | E04C 5/122 52/223.13 |
| 2004/0139670 A1 | | 7/2004 | Nieto et al. | |
| 2005/0034392 A1 | * | 2/2005 | Nuetzel | E04C 5/122 52/223.1 |
| 2014/0026372 A1 | * | 1/2014 | Stubler | E04C 5/122 24/122.6 |

FOREIGN PATENT DOCUMENTS

| | | |
|---|---|---|
| DE | 4118897 A1 | 12/1992 |
| DE | 20311950 U1 | 12/2004 |
| EP | 0323285 A1 | 7/1989 |
| EP | 0896108 A2 | 2/1999 |
| EP | 1227200 A1 | 7/2002 |
| FR | 2822177 A1 | 9/2002 |
| GB | 1418763 | * 12/1975 |
| GB | 2155973 A | 10/1985 |
| WO | 0120098 A | 3/2001 |

* cited by examiner

*Primary Examiner* — Edmund Lee
(74) *Attorney, Agent, or Firm* — Dentons US LLP

(57) ABSTRACT

The method is for protecting the end of a cable made of a plurality of parallel tendons (10) anchored using a block (15) having a front side, a rear side and channels (16) extending between the front and rear sides. Each tendon of the cable is held in a respective channel of the anchor block with a blocking member (19). The method comprises performing a first phase of injecting protective material (100) into at least some of the channels of the anchor block. A chamber (30) is formed on at least one side of the anchor block (15) so as to contain portions of the plurality of tendons. A second phase of injecting protective material (200) into the chamber (30) is then performed.

14 Claims, 5 Drawing Sheets

METHOD OF PROTECTING THE END OF A MULTI-TENDON CABLE

This Application is a 35 U.S.C. §371 National Stage Entry of International Application No. PCT/IB2011/001046, filed Apr. 15, 2011, which is incorporated by reference in its entirety herein.

BACKGROUND OF THE INVENTION

The present invention relates to structural cables used in construction works. It applies, in particular, to the anchoring of stay cables or pre-stressing cables.

Such structural cables are frequently made of a plurality of parallel tendons. Their ends are anchored using blocks in which channels are formed for receiving and blocking individually the tendons, for example by means of split conical jaws.

The tendons of the cable are made of metal, for example in the form of strands. In the main part of the cable, they are often contained in individual sheaths of plastic material which isolate them from the environment and thus protect them from corrosive agents. In order to firmly hold a tendon in the anchor block, its plastic sheath is removed in the anchoring region. It is then necessary to provide particular anti-corrosion protection measures in the anchoring region. In general, the volume containing the exposed portions of the tendons is filled with a protective material injected under pressure into the anchoring region.

The injection step must be carried out with caution so as to avoid any remaining voids in the volume to be filled, since such voids may be the starting point of the corrosion phenomenon for the metal of the tendons, in particular if water leaks in.

Wax is an interesting example of protective material to be injected in the anchoring region, in view of its properties of adherence, corrosion protection and fatigue behavior. The wax is in a solid state at room temperature and becomes liquid when heated. It can thus form a reversible filling, which is useful for allowing inspection of the anchorage.

Other injectable protective materials can be used, in particular thick materials, e.g. grease, or hardening materials, e.g. a resin or a polymer.

For a given construction work, the protective material is selected by taking into account the required functionalities for installing and or maintaining the anchorage.

The volume to be filled with protective material includes a chamber located on the front side of the anchorage and closed by a cover. The end portions of the tendons of the cable, protruding from the anchorage, are located in that chamber.

In certain anchorage designs (see, e.g., WO 01/20098 A1), there is a second chamber at the rear of the anchor block, in which the ends of the individual sheaths of the tendons are located. The rear face of that second chamber is closed by a sealing device, of the stuffing box type or the like, through which the sheathed parts of the tendons extend. The filling of the second chamber with the protective material can be carried out separately from the filling of the first chamber located on the front side of the anchorage, or simultaneously. In the latter case, one or more communication channels are generally provided through the anchor block, in addition to the channels containing the tendons, to allow the injected material to flow.

In other kinds of anchorage design (see, e.g., EP 0 896 108 A2 or EP 1 227 200 A1), the rear side of the anchor block does not have a second chamber containing the tendons collectively. The ends of the individual sheaths of the tendons are located in the channels of the anchor block, or in extensions of those channels provided on the rear side of the anchor block.

The injection is performed once the tendons have been installed and tensioned. Conventionally, the filling material is injected by an inlet located in a low portion of the anchorage until it flows out by a vent located in a high portion of the anchorage. This minimizes the risk of leaving voids in the volume to be filled.

However, that risk is not completely eliminated. When the level of the filling material rises and reaches the anchor block, the different channels form competing flow paths. The head loss in those channels is not uniform because the contents of channels can be different from one channel to another. For example, if the block has one or more communication channels in addition to the channels containing tendons, the fluid material has a tendency to flow through the communication channels, so that the other channels may remain with voids, thus exposing the metallic tendons. The possible presence of debris in a channel when the injection starts also changes the head loss through that channel and causes a risk of incomplete filling. If there are no communication channels and/or if there is a chamber only on the front side of the anchorage, it is also quite difficult to ensure a complete filling of the channels containing the tendons.

There is thus a need for an improved method of filling the inner volumes of an anchorage system to protect the tendons and other metallic components of the anchorage from corrosion.

SUMMARY OF THE INVENTION

A method of protecting an end of a cable made of a plurality of parallel tendons is proposed. The cable is anchored using an anchor block having a front side, a rear side and channels extending between the front and rear sides, the number of channels being at least equal to the number of tendons of the cable. Each tendon of the cable is held in a respective channel of the anchor block with a blocking member. The method comprises:

performing a first phase of injecting protective material into at least some of the channels of the anchor block;

forming a chamber on at least one of the front and rear sides of the anchor block, portions of the plurality of tendons being contained in the chamber; and performing a second phase of injecting protective material into the chamber.

The first injection phase makes it possible to ensure that the channels are properly filled. In particular, they can be filled individually by injecting a controlled amount of protective material. Typically, each channel of the anchor block containing a tendon receives protective material in the first injection phase.

The protective material injected into the channels of the anchor block in the first phase may be a wax or grease.

In an embodiment, the first injection phase comprises, for each channel:

sealingly applying a bell-shaped cover on an inlet of the channel;

injecting protective material inside the bell-shaped cover to force the protective material into the channel; and removing the bell-shaped cover.

For a channel which contains a tendon of the cable, the bell-shaped cover may have a passage for that tendon. It is then possible to attach the bell-shaped cover to the tendon when the protective material is injected in order to withstand the injection pressure.

The proposed method is also advantageous in that the protective material injected into the chamber in the second phase can be chosen different from the protective material injected into the channels of the anchor block in the first phase. The selection of the protective materials is made as a function of desired functionalities for each part of the anchorage in order to optimize the properties of the anchorage.

The method is applicable to an anchorage in which the chamber has two parts on the front and rear sides of the anchor block, respectively, connected together by at least one communication channel extending through the anchor block. Preferably, the communication channel is not filled with protective material in the first injection phase. In most cases, no tendon of the cable will be put in such a communication channel. The second injection phase may have a common step of injecting protective material into one of the parts of the chamber and, from said one of the parts of the chamber, into another part of the chamber through the at least one communication channel.

It is also applicable to anchorages in which there is a chamber only on the front side of the anchor block. This chamber contains end portions of the plurality of tendons of the cable, and receives protective material e.g. a wax or grease, in the second injection phase.

It is further applicable to anchorages having two chambers, namely a first chamber containing tensioned portions of the tendons, formed on the rear side of the anchor block, and a second chamber containing end portions of the tendons, formed on a front side of the anchor block. In such an embodiment, the second injection phase comprises injecting protective material into the first chamber and separately injecting protective material into the second chamber. The protective material, e.g. a polymer or a resin, injected into the first chamber can be chosen different from the protective material, e.g. a wax or grease, injected into the second chamber.

Other features and advantages of the method and apparatus disclosed herein will become apparent from the following description of non-limiting embodiments, with reference to the appended drawings.

BRIEF DESCRIPTION THE DRAWINGS

DESCRIPTION OF EMBODIMENTS

Figure 1:
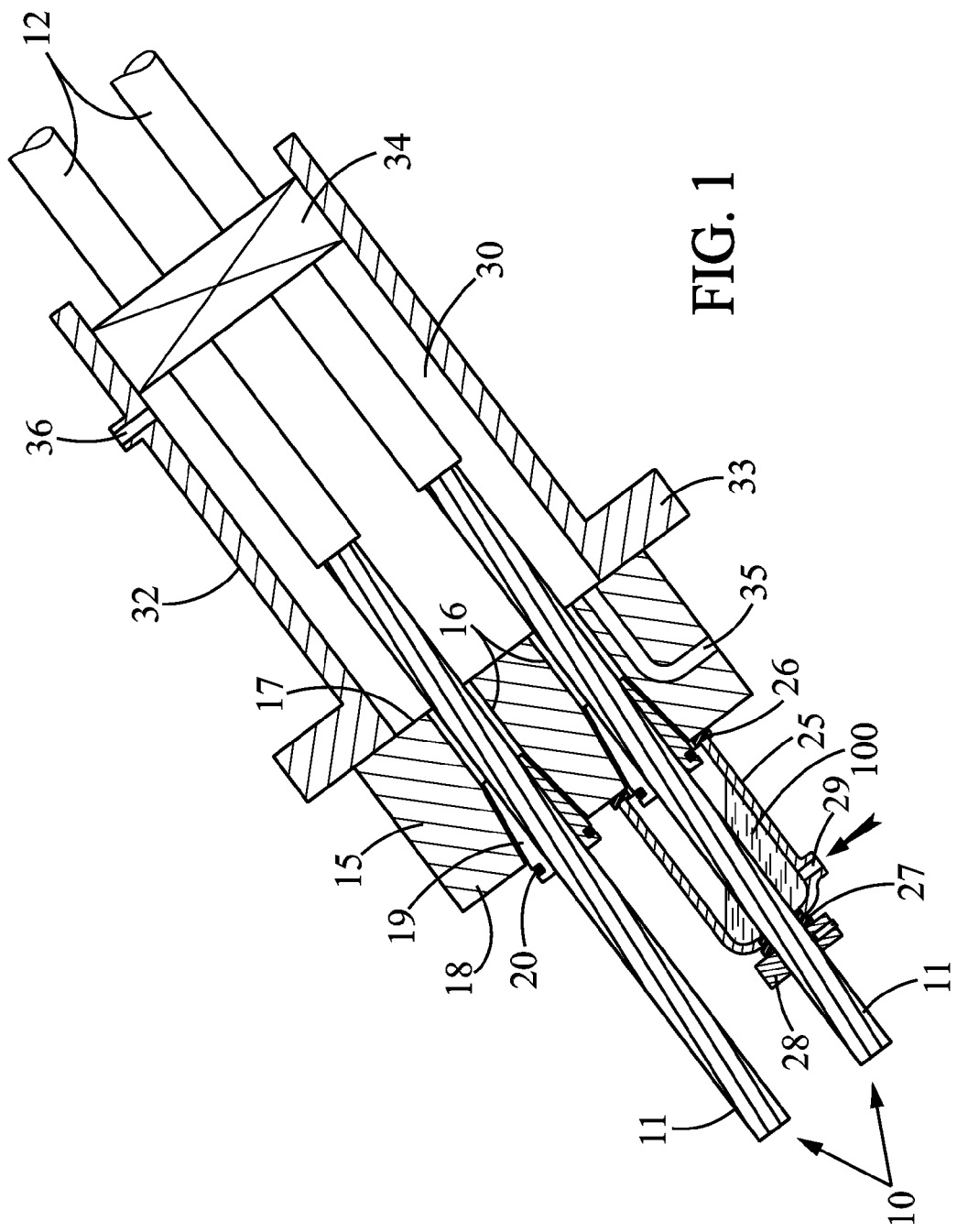
FIG. 1 is a schematic view of an exemplary anchoring device for a structural cable, in a first injection phase.
Figure 2:
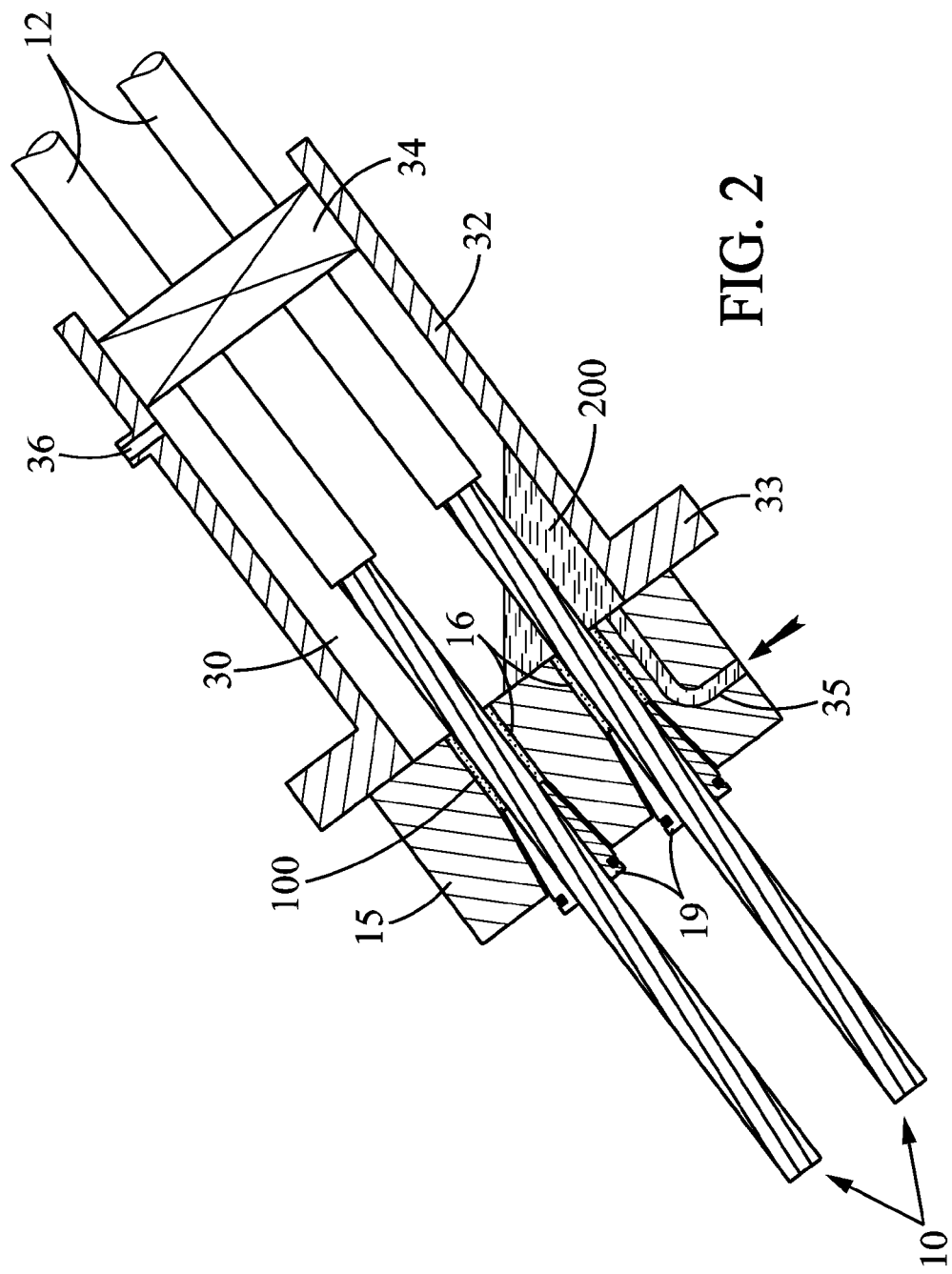
FIGS. 2-4 are schematic views of the anchoring device of FIG. 1, in other phases of a method according to an embodiment of the invention.
Figure 3:
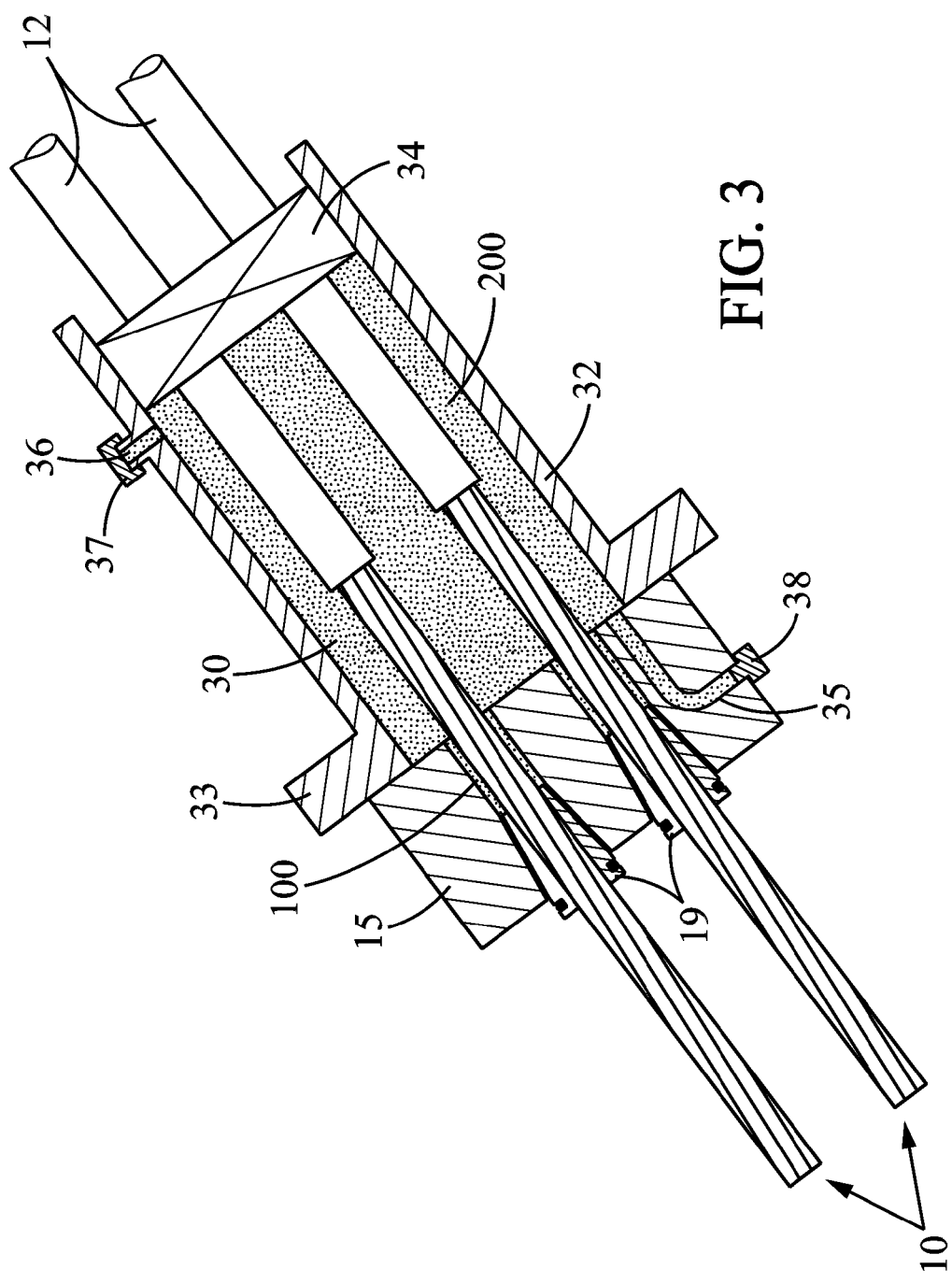

The structural cable shown in FIG. 1 is made of a plurality of tendons 10 each consisting of a metallic strand 11 contained in an individual plastic sheath 12. Only two tendons 10 are shown in the figures for simplicity of the drawing. Typically, a higher number of tendons, e.g. a few tens of tendons, are used. The tendons 10 extend parallel to each other along the prescribed path of the structural cable, e.g. along the inclined path of a stay cable between the deck and a pylon of a bridge, or along the path specified for a pre-stressing cable.

The structural cable is anchored at both ends. The anchoring devices transfer the tensile load of the cable to the structure.

In order to firmly grip the tendons 10 in the anchoring devices, the plastic sheaths 12 are removed at the ends of the tendons 10, thus exposing the metal of the strands 11. At each end of the cable, the bare parts of the tendons 10 extend through and beyond an anchor block 15 of the anchoring device. The anchor block 15 has a number of channels 16 extending between its rear side 17 (towards the running part of the cable where the tendons will be under tension) and its front side 18. Each tendon 10 is received within one of the channels 16 with a blocking member 19.

In the illustrated embodiment, each channel 16 designed to receive a tendon 10 has a cylindrical part near the rear side 17 of the anchor block 15, with a diameter slightly larger than that of the strand 11, extended by a conical part which tapers outwardly towards the front side 18 of the anchor block 15. The blocking member is in the form of a conical jaw 19 placed in the conical part of the channel 16 to grip the metallic strand 11. The jaw 19 has a cylindrical axial bore for receiving the strand, and is made of a plurality of sectors (e.g. three sectors) held together by a ring 20 inserted in an annular groove located near the wide end of the jaw 19.

To install the cable, its tendons 10 are inserted into their respective channels 16 with the conical jaws 19, the tensile force is applied by holding the strands 11 in their parts projecting from the front face 18 of the anchor block 15, pulling them using an actuator such as a hydraulic jack, and pushing the jaws 19 into the channels 16. When the actuator is deactivated, the jaws 19 block the strands 11 in their channels 16. This tensioning operation can be performed strand by strand, group of strands by group of strands, or collectively for the whole cable.

After the cable has been tensioned, there remain some intervals in the channels 16, in particular around the strands 11 in their cylindrical parts and between the jaw sectors in their conical parts.

A first injection phase is carried out to make sure that these intervals are filled with a substance 100 which will protect the metal from corrosion.

In an embodiment, the substance with which the channels 16 are filled in the first injection phase is a wax or grease. However, it may also be a curing material such as a polymer or a resin.

As shown in FIG. 1, the first injection phase can be performed for each channel 16 by using a bell-shaped cover 25 over the inlet of the channel. The cover 25 is sealingly applied against the front side 18 of the anchor block 15 using a gasket 26, and its opposite end has an aperture providing a passage for the strand 11. A sealing ring 27 is placed around the strand 11 to seal the front end of the cover 25 which is secured in its position by a ring 28 clamped on the free end of the strand 11.

The protective material 100 is injected in a fluid or soft phase through an inlet 29 provided in the cover 25. Since the volume of the intervals not occupied by the metallic strand and jaw is known with precision, a regulated amount of protective material can be injected into each channel 16 to ensure complete filling of the channel. An injection pump (not shown) is controlled to inject the set amount of protective material 100 inside the cover 25 to completely fill the channel 16.

The attachment of the bell-shaped cover 25 to the strand 11 ensures that the cover 25 is kept in place at the inlet of the channel 16 while the protective material is injected under pressure to overcome the head loss within the channel 16. It will be noted that other mechanisms can be used to hold the cover in that step, for example attached to the anchor block 15.

The filling material 100 injected into the channels 16 is allowed to cure (if it is a polymer or resin) or to solidify by cooling (if it is a wax) and the cover 25 is removed from the front side of the anchor block 15. If the filling 100 is a thick material such as grease, no hardening time is needed and the cover may be removed just after the injection. An amount of protective material 100 may or may not remain on the portion of the strand 11 which was contained in the cover 25.

After the first injection phase, a second injection phase is carried out to fill the other closed volume(s) of the anchorage with protective material. In the embodiment illustrated by FIGS. 1-4, there are two chambers to be filled, one 30 on the rear side of the anchor block 15 and one 31 on the front side. These two chambers 30, 31 are filled separately with protective material 200, 300.

The first chamber 30 on the rear side 17 of the anchor block is delimited radially by a tube 32 through with the tensioned parts of the tendons 10 extend. The ends of the plastic sheaths 12 of the tendons are located within the chamber 30. Opposite the anchor block 15, the chamber 30 is closed by a sealing device 34, for example a stuffing box arrangement as described in WO 01/20098 A1, which isolates the chamber 30 from the outside while leaving passages for the tendons 10.

In this example, the front end of the tube 32 has a flange 33 which forms a bearing surface for the anchor block 15, the flange 33 being applied against the structure equipped with the cable. It will be appreciated that the anchorage may have various other arrangements within the scope of the present invention.

The injection of the protective material 200 into the first chamber 30 (FIG. 2) is performed though an inlet which, in the illustrated example, is formed by an opening 35 provided in the anchor block 15, in a low part of the chamber 30. In the illustrated structure, the opening 35 is bent to be accessible on a lateral side of the anchor block 15. It may also be straight and accessible on the front side 18 of the anchor block 15. A vent 36 is formed in an upper part of the tube 32 to evacuate the air contained in the chamber 30 during the injection step. Once the injection is complete, the vent 36 is closed by a plug 37 (FIG. 3) and the protective material 200 is allowed to harden or solidify, if needed, prior to closing the inlet opening 35 with another plug 38.

Figure 4:
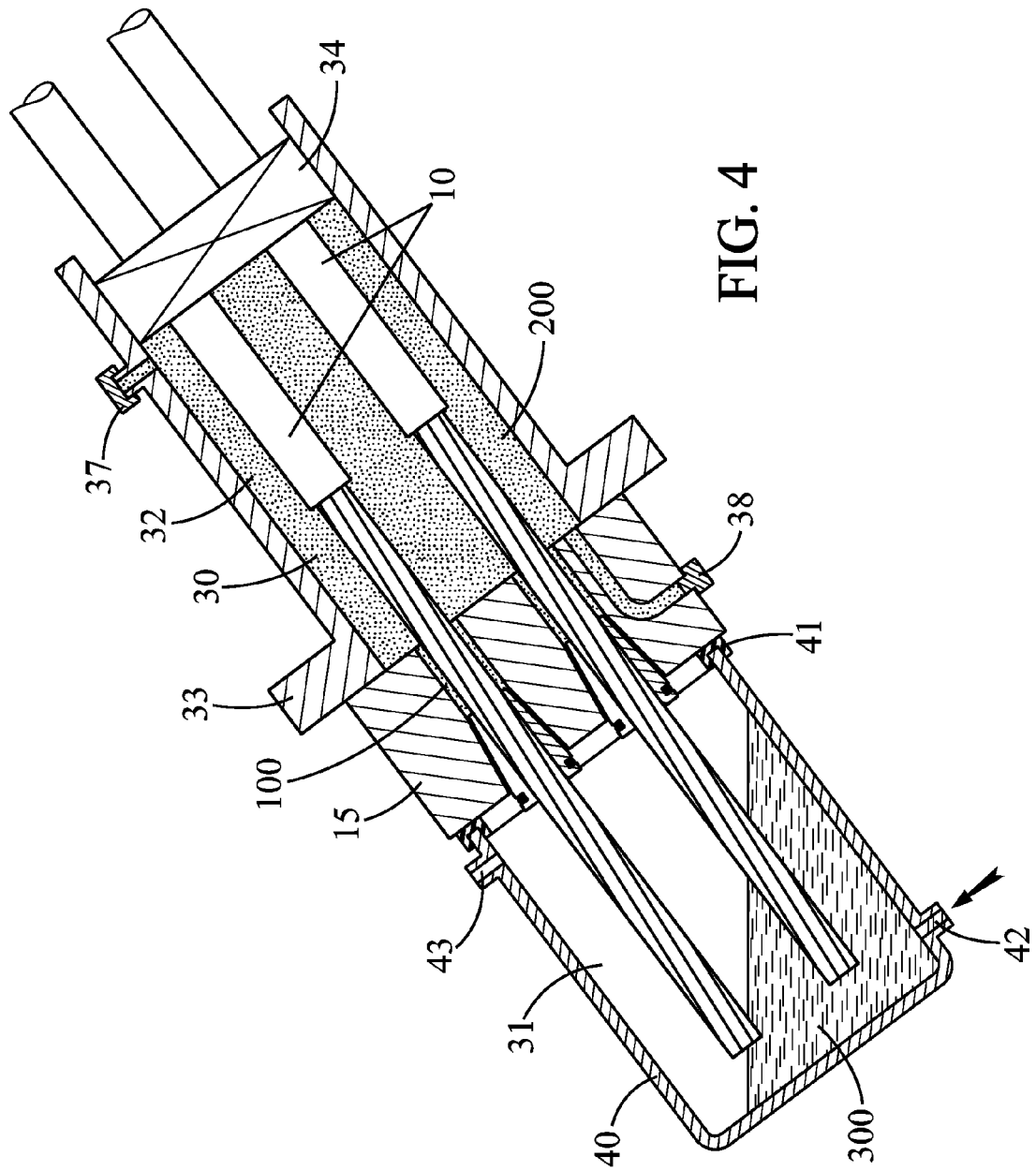

The second chamber 31 on the front side 18 of the anchor block is delimited by a case 40 shown in FIG. 4. The case 40 is mounted on the anchor block 15 by means of bolts or other fixing means (not shown). A sealing ring 41 is provided between the rear end of the case 40 and the front face 18 of the anchor block to prevent the protective material from leaking when injected. The case 40 is dimensioned to contain the bare ends of all the tendons 10 of the cable. Its lower part has an opening 42 for injecting the protective material 300 and its upper part has a vent 43 for evacuating the air when the protective material 300 is injected.

The protective material 300 injected into the second chamber 31 fills all the remaining voids. When it flows out though the vent 43, the injection is stopped and a plug 45 is placed on the vent 43. The injected protective material 300 is allowed to harden or solidify, if needed, prior to closing the inlet opening 42 with another plug.

The protective material injected to fill (i) the channels 16, (ii) the chamber 30 at the rear of the anchor block 15 and (iii) the chamber 31 at the front of the anchor block 15 can be selected independently for each volume to be filled, thus permitting an optimization of the anchorage by choosing each material for its properties as desired.

The chamber 31 located at the front of the anchor block 15 may be opened, by removing the case 40, during the lifetime of the anchorage to enable checking of its proper operation. For this reason, it is typically desirable to use in that chamber 31 a protective material 300 which can be easily removed. A wax is an advantageous material for this purpose since it can be melted or at least softened by heating and pumped out. Grease can also be used.

The gripping and anchoring of the tendons 10 takes place in the channels 16. A flexible material 100 having lubricating properties, such as grease or wax, is suitable in view of its good fatigue behavior which enhances the ultimate strength of the tendons.

The chamber 30 at the rear of the anchor block 15 is potentially exposed to infiltrations of water flowing along the structure or the cable. A flexible, sticky and coherent material 200 is often a good choice to best prevent such infiltrations. A polymer or a resin is advantageously injected in that part of the anchorage.

Figure 5:
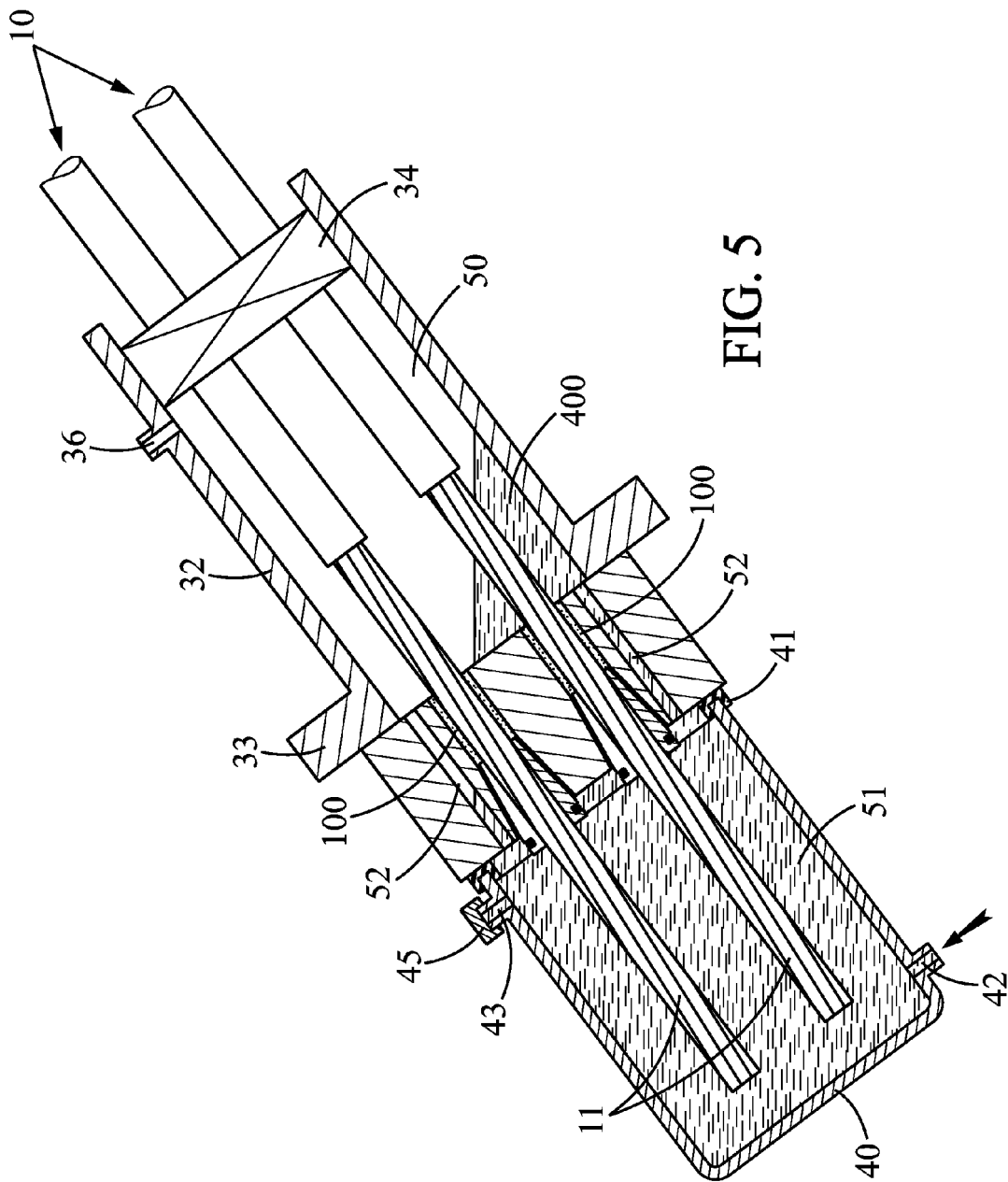
FIG. 5 is a schematic view of another embodiment of the anchoring device.

FIG. 5 illustrates an alternative embodiment of an anchoring device, for which the second injection phase, i.e. after filling of the channels 16 where the tendons are blocked, is essentially performed in one step. The chamber thus filled is made of two parts 50, 51 connected together by one or more communication channels 52. The first part 50 is located on the rear side 17 of the anchor block 15 and is functionally similar to the first chamber 30 of the embodiment shown in FIGS. 1-4, being delimited by a cylindrical tube 32 and a stuffing box-type of sealing device 34. The second part 51 is located on the front side 18 of the anchor block 15 and is functionally similar to the second chamber 31 of the embodiment shown in FIGS. 1-4, being delimited by a case 40. The communication channels 52 do not contain tendons and extend through the anchor block 15 parallel to the channels 16 containing the tendons.

After installation and tensioning of the tendons 10, the first injection phase is performed to fill the channels 16 with a protective substance 100 as described with reference to FIG. 1. Then the case 40 is assembled on the anchor block 15 and the second injection phase is performed to inject a protective material 400 in the two-part chamber 50-51.

The example of FIG. 5 is, for example, that of the anchorage of the lower end of an inclined stay cable. In this configuration the lower part of the anchorage is in the lower part of the case an inlet 42 is provided. As in the previous embodiment, two vents 36, 43 are provided, one (36) in the upper part of the rear part 50 of the chamber and the other (43) in the upper part of the front part 51 of the chamber. During the second injection phase, the level of the fluid material 400 rises. When it reaches the vent 43, it overflows and a plug 45 is put on that vent 43 to continue the injection, thus permitting the protective material 400 to rise further through the communication channels 52 and into the rear part 50 of the chamber. When the other vent 36 is reached, the second injection phase is over and a plug is put on the vent 36. The protective material 400 is allowed to harden or solidify, if needed, prior to closing the inlet opening 42 with another plug.

In the embodiment of FIG. 5, the protective material 400 injected into the chamber 50-51 in the second phase is preferably, though not necessarily, the same as the protective material 100 injected into the channels 16 in the first phase. For example, a wax or grease may be injected into the channels 16 and then into the two-part chamber 50-51.

However, specifications of a given work can make it preferable to use different filler materials.

In yet another embodiment, the chamber filled in the second injection phase is located only on the front side of the anchor block 15. The plastic sheaths 12 of the tendons 10 then have their end sections inside the channels 16 of the anchor block 15 or in individual extensions of those channels behind the anchor block 15.

In this case, the first injection phase is performed to fill the channels 16 and/or their extensions with the protective material 100. The filling is made at least in the parts of the channels 16 and/or their extensions where the metal of the strand is free of plastic sheath. The separate injection of the protective material into the channels 16 and/or their extensions ensures a reliable filling irrespective of the variable head losses typically experienced by the injected substance in those channels.

Afterwards, the second injection phase is carried out to introduce the protective material 300, which is preferably different from the previously injected protective material 100, into the chamber 31 located only on the front side 18 of the anchor block 15 and containing the end portions of the strands 11. This can be performed in the same manner as described with reference to FIG. 4.

In the case where the chamber 31 to be filled with protective material is located only on the front side of the anchor block 15, wax or grease will often be a suitable choice for the protective material both in the channels 16 and in the chamber 31 because of its good fatigue properties (for the channels 16) and because it is relatively easy to remove (for the chamber 31). However, other choices may be suitable or preferable. For instance, water-tightness at the rear of the channels in such an anchorage design can be a concern. For this reason, an adhering filler material such as a polymer or a resin may be used in the channels 16, while a wax or grease is injected into the chamber 31.

The above-described method of protecting the bare ends of the tendons of a structural cable using two or more injection phases in different parts of the anchoring device is applicable to the installation of a new cable. It is also applicable to the maintenance or repair of an existing cable. In this case, the protective filler material which was previously located in the different parts of the anchoring device may be removed (for example using a method as described in French patent application No. 11 52557 filed on Mar. 28, 2011) prior to injecting one or more new protective material (s) in two or more phases as described above.

While a detailed description of exemplary embodiments of the invention has been given above, various alternatives, modifications, and equivalents will be apparent to those skilled in the art.

In particular, it will be appreciated that the above-mentioned choices for the protective materials with which the different parts of the anchorage are filled is a matter of design optimization, and may be changed depending on the functionalities desired for a specific anchorage design having a specific geometrical configuration or disposition.

It will also be appreciated that the above-described installation method, using several injection phases to fill first the channels 16 containing tendons and then one or more chambers on one or both sides of the anchor block 15, provides the benefit of ensuring proper filling and protection of the metallic tendons even in cases where the same protective substance is used in all parts of the anchorage.

The invention claimed is:

1. A method of protecting an end of a cable made of a plurality of parallel tendons and anchored using an anchor block having a front side a rear side and channels extending between the front and rear sides, each tendon of the cable being held in a respective channel of the anchor block with a blocking member, the method comprising:
   performing a first phase of injecting protective material into at least some of the channels of the anchor block;
   forming a chamber on at least the front side of the anchor block, end portions of the plurality of tendons being contained in said chamber; and
   performing a second phase of injecting protective material into said chamber, whereby the protective material injected in the second phase is in contact with the end portions of the tendons,
   wherein the first injection phase comprises, for each channel:
      sealingly applying a bell-shaped cover on an inlet of the channel;
      injecting protective material inside the bell-shaped cover to force the protective material into the channel; and
      removing the bell-shaped cover.

2. The method as claimed in claim 1, wherein each channel of the anchor block containing a tendon receives protective material in the first injection phase.

3. The method as claimed in claim 1, wherein the bell-shaped cover has a passage for a tendon of the cable extending through the channel and wherein the bell-shaped cover is attached to said tendon when the protective material is injected inside the bell-shaped cover.

4. The method as claimed in claim 1, wherein the protective material injected into the channels of the anchor block in the first phase is a wax or grease.

5. The method as claimed in claim 1, wherein the protective material injected into the chamber in the second phase is different from the protective material injected into the channels of the anchor block in the first phase.

6. The method as claimed in claim 1, wherein the chamber has at least two parts on the front and rear sides of the anchor block, respectively, connected together by at least one communication channel extending through the anchor block, wherein protective material is not injected into the communication channel in the first injection phase and wherein the second injection phase has a common step of injecting protective material into one of the parts of the chamber and, from said one of the parts of the chamber, into another part of the chamber through the at least one communication channel.

7. The method as claimed in claim 6, wherein no tendon of the cable is put in the communication channel.

8. The method as claimed in claim 1, wherein a first chamber containing tensioned portions of the tendons is formed on the rear side of the anchor block, wherein a second chamber containing said end portions of the tendons is formed on the front side of the anchor block, and wherein protective material is injected into the first chamber and separately into the second chamber.

9. The method as claimed in claim 8, wherein the protective material injected into the first chamber is different from the protective material injected into the second chamber.

10. The method as claimed in claim 9, wherein the protective material injected into the first chamber is a polymer or a resin.

11. The method as claimed in claim 9, wherein the protective material injected into the second chamber is a wax or grease.

12. The method as claimed in claim 1, wherein a chamber is formed only on the front side of the anchor block, said chamber containing end portions of the plurality of tendons of the cable and receiving protective material in the second injection phase.

13. The method as claimed in claim 12, wherein the protective material injected into said chamber in the second injection phase is a wax or grease.

14. The method as claimed in claim 12, wherein the protective material injected into the channels of the anchor block in the first phase is a polymer or a resin.

* * * * *